US012660004B2

(12) United States Patent
Han et al.

(10) Patent No.: US 12,660,004 B2
(45) Date of Patent: Jun. 16, 2026

(54) COMMUNICATION LINK DETERMINING METHOD AND APPARATUS, AND DEVICE AND STORAGE MEDIUM

(71) Applicant: ZTE CORPORATION, Guangdong (CN)

(72) Inventors: Zhiqiang Han, Guangdong (CN); Yonggang Fang, Guangdong (CN); Bo Sun, Guangdong (CN); Nan Li, Guangdong (CN); Dan Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 222 days.

(21) Appl. No.: 17/762,393

(22) PCT Filed: Sep. 27, 2020

(86) PCT No.: PCT/CN2020/118159
§ 371 (c)(1),
(2) Date: Mar. 22, 2022

(87) PCT Pub. No.: WO2021/057979
PCT Pub. Date: Apr. 1, 2021

(65) Prior Publication Data
US 2022/0346141 A1 Oct. 27, 2022

(30) Foreign Application Priority Data
Sep. 27, 2019 (CN) .......................... 201910926947.8

(51) Int. Cl.
| | |
|---|---|
| *H04W 74/0833* | (2024.01) |
| *H04W 74/00* | (2009.01) |
| *H04W 74/08* | (2009.01) |

(52) U.S. Cl.
CPC ....... *H04W 74/085* (2013.01); *H04W 74/002* (2013.01); *H04W 74/0866* (2013.01)

(58) Field of Classification Search
CPC ............. H04W 74/085; H04W 74/008; H04W 74/0866; H04W 74/0808; H04W 74/0816
(Continued)

(56) References Cited

U.S. PATENT DOCUMENTS

| | | | |
|---|---|---|---|
| 10,201,019 B2 | 2/2019 | Kim et al. | |
| 11,265,927 B1 * | 3/2022 | Chu .................... | H04W 74/085 |

(Continued)

FOREIGN PATENT DOCUMENTS

| | | |
|---|---|---|
| CN | 103079275 | 5/2013 |
| CN | 104170336 A | 11/2014 |

(Continued)

OTHER PUBLICATIONS

European Search Report mailed Sep. 14, 2023; European Patent Application No. 20868613.9.
(Continued)

*Primary Examiner* — Mang Hang Yeung
(74) *Attorney, Agent, or Firm* — McDonald Hopkins LLC

(57) ABSTRACT

Provided are a communication link determination method and apparatus, a device and a storage medium. The method includes the following. A first communication link set in which a channel state of at least one communication link is idle is determined in a communication link set supported by a device. A second communication link set is determined according to the channel state of the at least one communication link in the first communication link set during a preset time period. A target communication link set for transmitting a radio frame is determined according to a channel state of at least one communication link in the second communication link set in a backoff procedure.

20 Claims, 5 Drawing Sheets

(58) Field of Classification Search
USPC ........................................................ 370/329
See application file for complete search history.

(56) References Cited

U.S. PATENT DOCUMENTS

| | | | |
|---|---|---|---|
| 2007/0263654 A1 | 11/2007 | Salokannel et al. | |
| 2011/0116401 A1* | 5/2011 | Banerjea | H04W 84/12 |
| | | | 370/252 |
| 2013/0311168 A1 | 11/2013 | Li | |
| 2016/0081100 A1* | 3/2016 | Du | H04W 52/04 |
| | | | 370/329 |
| 2016/0381704 A1* | 12/2016 | Chu | H04W 52/0216 |
| | | | 370/329 |
| 2017/0164409 A1 | 6/2017 | Kim et al. | |
| 2017/0188336 A1 | 6/2017 | Ahn et al. | |
| 2017/0311168 A1 | 10/2017 | Khawer et al. | |
| 2019/0191458 A1* | 6/2019 | Wu | H04W 74/0808 |

FOREIGN PATENT DOCUMENTS

| | | | |
|---|---|---|---|
| CN | 105191476 A | | 12/2015 |
| CN | 105554888 A | | 5/2016 |
| CN | 106304390 | | 1/2017 |
| CN | 106304390 A | | 1/2017 |
| CN | 107613570 A | | 1/2018 |
| CN | 107770879 | | 3/2018 |
| CN | 108495372 A | | 9/2018 |
| CN | 108541076 A | | 9/2018 |
| CN | 109716853 A | | 5/2019 |
| CN | 110167169 A | | 8/2019 |
| DE | 102019201253 A1 | | 8/2019 |
| GB | 2540184 A | | 1/2017 |
| WO | 2017084582 | | 5/2017 |
| WO | 2017194128 | | 11/2017 |
| WO | 2018000932 A1 | | 1/2018 |

OTHER PUBLICATIONS

Patent Cooperation Treaty (PCT), International Search Report and Written Opinion for Application PCT/CN2020/118159 filed on Sep. 27, 2020, mailed Dec. 31, 2020, International Searching Authority, CN.

Search Report and Office Action dated Jan. 5, 2025; Chinese Application No. 019109269478 filed Sep. 27, 2019. 12 pages.

Office Action dated May 30, 2025. Chinese Patent Application No. 201910926947.8. 14 pages.

Wu Yanling; Niu Yi; Li Ming; "Research on MAC Layer Capacity of Ad hoc Networks," Communication Technology, No. 11, 3 pages. (Nov. 10, 2007).

Chen Wei; Qin Zhiguang; Deng Wei; Nie Peng; "Delay routing measurement in multi-rate and multi-hop wireless networks with channel competition sensing," Journal of University of Electronic Science and Technology of China, No. 05, 5 pages. (Sep. 20, 2012).

* cited by examiner

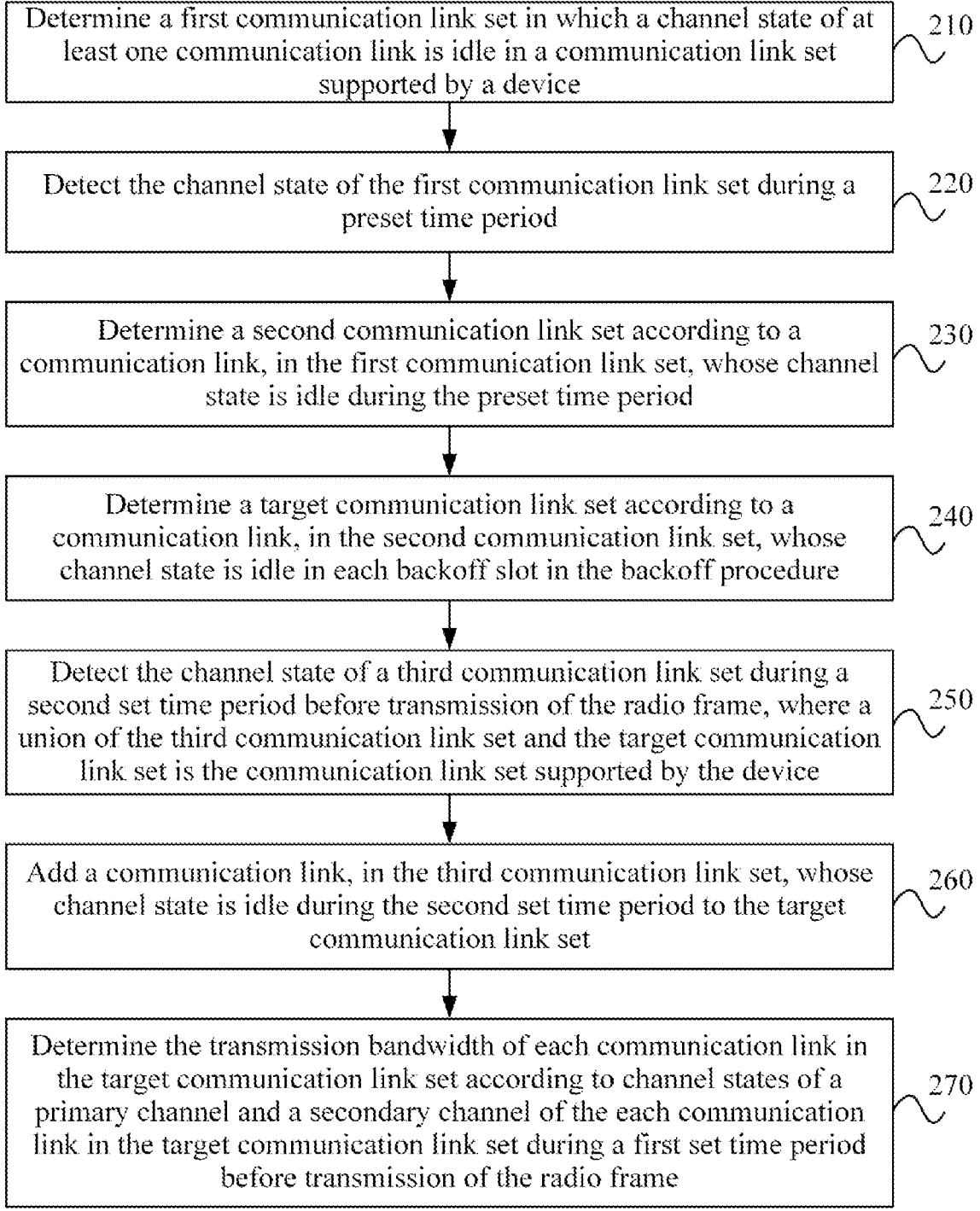

Determine a first communication link set in which a channel state of at least one communication link is idle in a communication link set supported by a device ~210

Detect the channel state of the first communication link set during a preset time period ~220

Determine a second communication link set according to a communication link, in the first communication link set, whose channel state is idle during the preset time period ~230

Determine a target communication link set according to a communication link, in the second communication link set, whose channel state is idle in each backoff slot in the backoff procedure ~240

Detect the channel state of a third communication link set during a second set time period before transmission of the radio frame, where a union of the third communication link set and the target communication link set is the communication link set supported by the device ~250

Add a communication link, in the third communication link set, whose channel state is idle during the second set time period to the target communication link set ~260

Determine the transmission bandwidth of each communication link in the target communication link set according to channel states of a primary channel and a secondary channel of the each communication link in the target communication link set during a first set time period before transmission of the radio frame ~270

FIG. 5

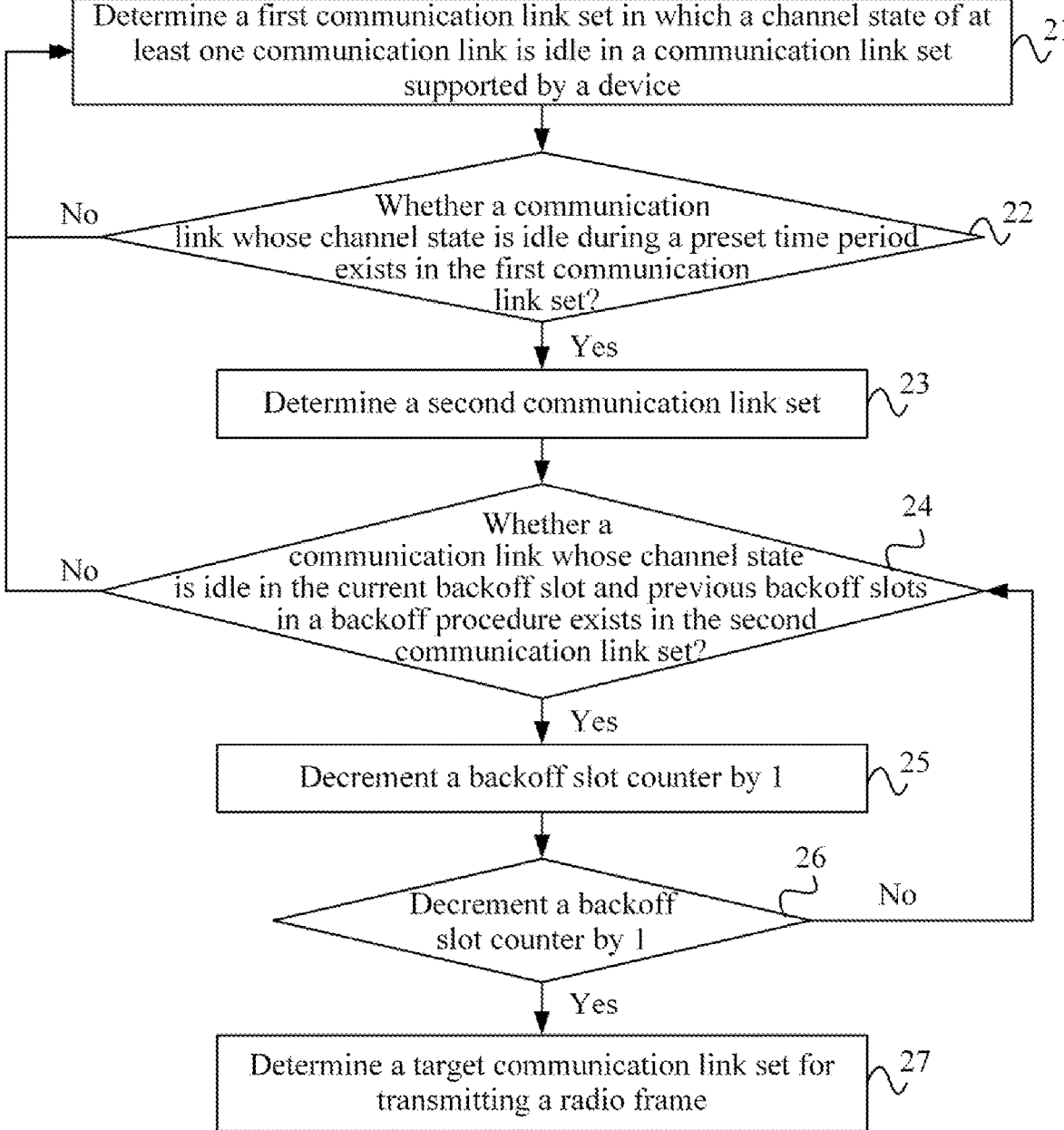

Determine a first communication link set in which a channel state of at least one communication link is idle in a communication link set supported by a device ~21

Whether a communication link whose channel state is idle during a preset time period exists in the first communication link set? ~22

No

Yes

Determine a second communication link set ~23

Whether a communication link whose channel state is idle in the current backoff slot and previous backoff slots in a backoff procedure exists in the second communication link set? ~24

No

Yes

Decrement a backoff slot counter by 1 ~25

Decrement a backoff slot counter by 1 ~26

No

Yes

Determine a target communication link set for transmitting a radio frame ~27

FIG. 6

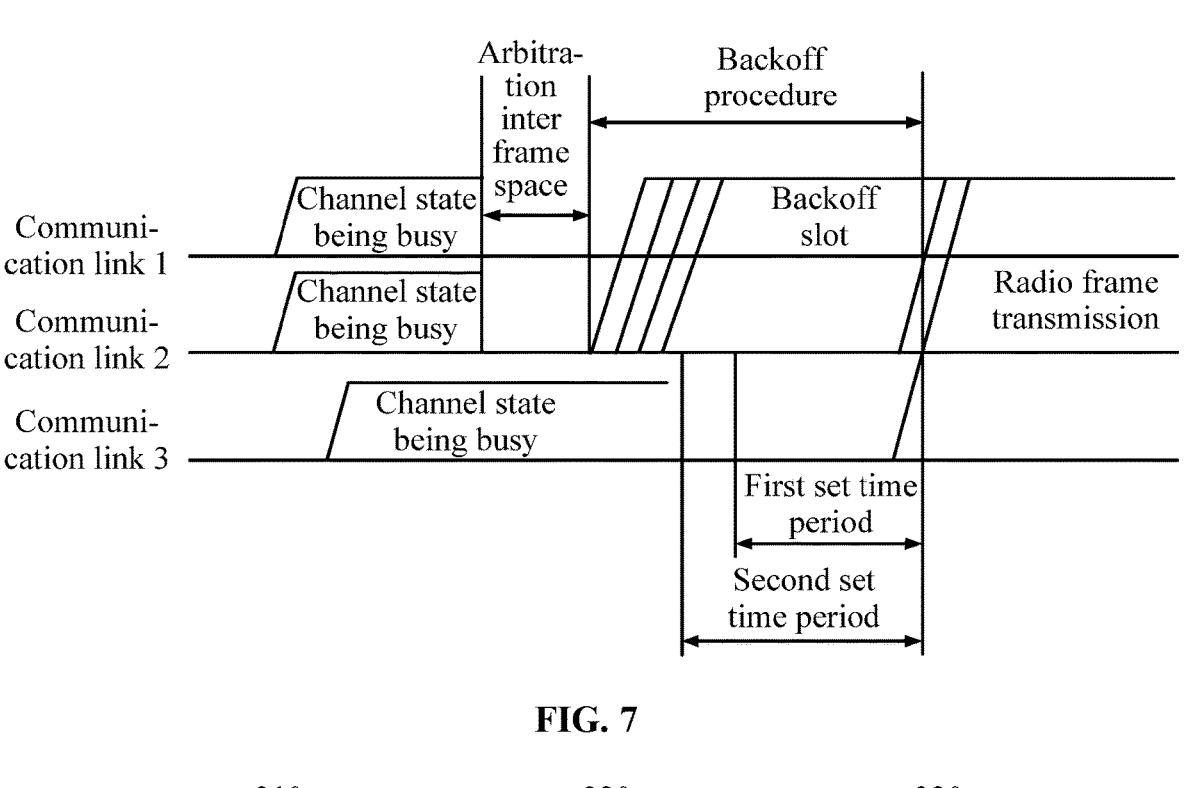
FIG. 7
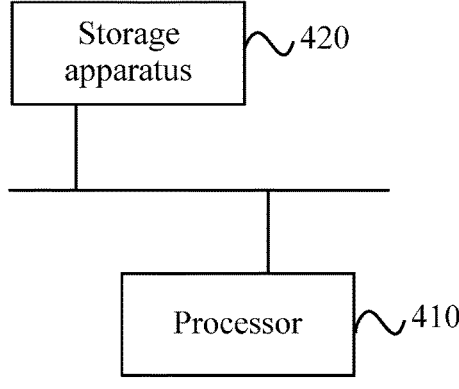
FIG. 8
FIG. 9

COMMUNICATION LINK DETERMINING METHOD AND APPARATUS, AND DEVICE AND STORAGE MEDIUM

This application is a U.S. National Stage Application, filed under 35 U.S.C. 371 of International Patent Application No. PCT/CN2020/118159 filed Sep. 27, 2020, which claims priority to Chinese Patent Application No. 201910926947.8 filed with the China National Intellectual Property Administration (CNIPA) on Sep. 27, 2019, the disclosures of each of which are incorporated herein by reference in their entireties.

TECHNICAL FIELD

The present application relates to wireless communication networks, for example, a communication link determination method and apparatus, a device and a storage medium.

BACKGROUND

With the development of wireless communication technology and the rapid growth of business requirements, users have higher and higher requirements for coverage capability, quality of service and throughput of wireless communication. Multi-link communication technology can provide more communication links and larger transmission bandwidth for devices to transmit more data. Each communication link may be referred to as a channel, or a link or a band, and data can be transmitted by using a communication link whose channel state is idle. The bandwidth of each communication link is composed of a base bandwidth set by the frequency band in which the communication link is located. However, in the application scene of multiple communication links, the channel state of each communication link changes continuously, and conflicts exist in data transmission between each communication link, resulting in poor reliability of the multi-link communication.

SUMMARY

The present application provides a communication link determination method and apparatus, a device and a storage medium to improve the reliability of multi-link communication.

Embodiments of the present application provide a communication link determination method. The method includes the following.

A first communication link set in which a channel state of at least one communication link is idle is determined in a communication link set supported by a device.

A second communication link set is determined according to the channel state of the at least one communication link in the first communication link set during a preset time period.

A target communication link set for transmitting a radio frame is determined according to a channel state of at least one communication link in the second communication link set in a backoff procedure.

The embodiments of the present application further provide a communication link determination apparatus. The communication link determination apparatus includes a first link determination module, a second link determination module and a target link determination module.

The first link determination module is configured to determine, in a communication link set supported by a device, a first communication link set in which a channel state of at least one communication link is idle.

The second link determination module is configured to determine a second communication link set according to the channel state of the at least one communication link in the first communication link set during a preset time period.

The target link determination module is configured to determine a target communication link set for transmitting a radio frame according to a channel state of at least one communication link in the second communication link set in a backoff procedure.

The embodiments of the present disclosure further provide a device. The device includes one or more processors and a storage apparatus configured to store one or more programs.

The one or more programs, when executed by the one or more processors, cause the one or more processors to implement the preceding communication link determination method.

The embodiments of the present application further provide a computer-readable storage medium, which is configured to store a computer program which, when executed by a processor, implements the preceding communication link determination method.

BRIEF DESCRIPTION OF DRAWINGS

FIG. 5 is a flowchart of another communication link determination method according to an embodiment;

FIG. 6 is a flowchart of another communication link determination method according to an embodiment;

FIG. 7 is a schematic diagram of another communication link determination process according to an embodiment;

FIG. 8 is a structural diagram of a communication link determination apparatus according to an embodiment; and FIG. 9 is a structural diagram of a device according to an embodiment.

DETAILED DESCRIPTION

The present application is described below in conjunction with drawings and embodiments. The embodiments described herein are merely intended to explain and not to limit the present application. It is to be noted that if not in collision, the embodiments of the present application and features therein may be combined with each other in any manner.

In the application scene of multi-link communication, the channel state of each communication link changes continuously, and conflicts exist in data transmission between each communication link, resulting in poor reliability of the multi-link communication. In the embodiment of the present application, a communication link determination method is provided. The channel state of each communication link is detected in a backoff procedure before transmission of a radio frame, thus the change of the channel state of each communication link is considered, and then a target communication link is determined, so that the reliability of the multi-link communication is improved.

Figure 1:
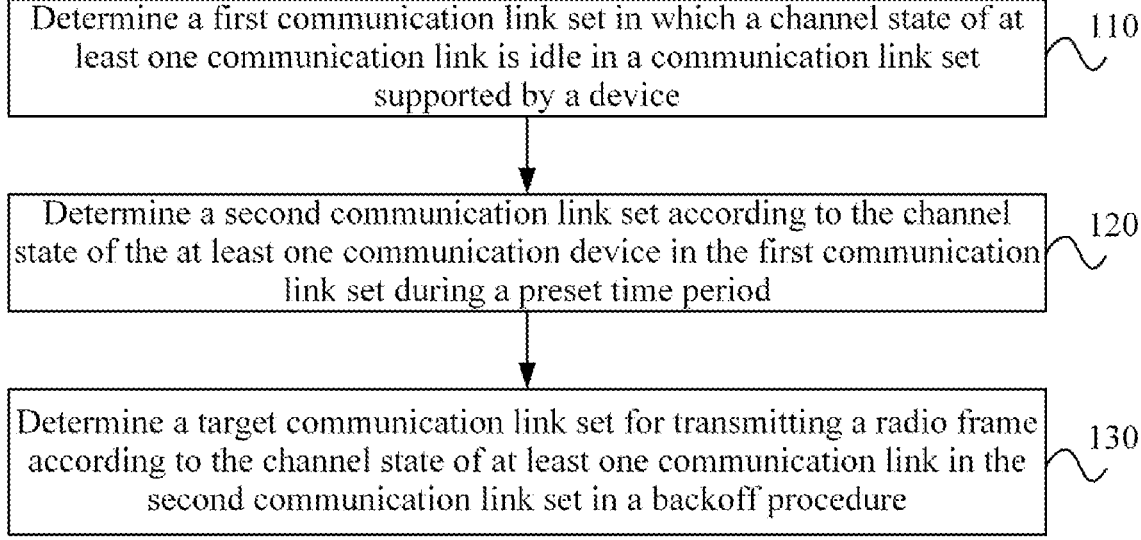
FIG. 1 is a flowchart of a communication link determination method according to an embodiment.

FIG. 1 is a flowchart of a communication link determination method according to an embodiment. The communication link determination method of the embodiment is applicable to a device supporting data transmission with another device through at least one communication link, for example, a sender device of the data. As shown in FIG. 1, the method of the embodiment includes 110, 120 and 130.

In 110, a first communication link set in which a channel state of at least one communication link is idle is determined in a communication link set supported by a device.

In the embodiment, the channel state of each communication link in the communication link set supported by the device is detected, and in the case where the channel state of at least one communication link is idle, the at least one communication link whose channel state is idle is determined as the first communication link set. The communication link set supported by the device is composed of communication links supported by both a data receiver and a data transmitter.

In 120, a second communication link set is determined according to the channel state of the at least one communication link in the first communication link set during a preset time period.

In the embodiment, the channel state of each communication link in the first communication link set is detected during the preset time period, and in the case where at least one communication link whose channel state is idle during the preset time period exists, the at least one communication link whose channel state is idle during the preset time period is determined as the second communication link set. In the embodiment, the preset time period may be an arbitration inter-frame space (AIFS). The communication link, in the first communication link set, whose channel state is idle during the preset time period is determined as the second communication link set to activate a backoff procedure.

In 130, a target communication link set for transmitting a radio frame is determined according to the channel state of at least one communication link in the second communication link set in a backoff procedure.

In an embodiment, the backoff procedure includes a preset number of backoff slots. The communication link, in the second communication link set, whose channel state is idle in each backoff slot finally composes the target communication link set. The target communication link set may include at least one communication link whose channel state is always idle in the above backoff procedure, and the at least one target communication link may be used for transmitting a radio frame. The radio frame may be a data frame, a management frame or a control frame.

The network architecture of a wireless local area network (WLAN) is composed of two types of devices: an access point (AP) and a station (STA). An access point and multiple stations compose a basic service set (BSS). In the embodiment, the station and the access point are both devices supporting multiple communication links. The multiple communication links refer to multiple wireless communication links, such as communication links on an unlicensed frequency band that may adopt a Listen before Talk (LBT) mechanism.

In the preceding embodiment, a clear channel assessment (CCA) is performed on each communication link supported by the device through a carrier sense (CS) mechanism. The carrier sense mechanism includes physical carrier sense and virtual carrier sense. The physical carrier sense is provided by a physical layer (PHY), and the clear channel assessment is performed by the PHY layer receiving a signal. The virtual carrier sense declares the time to use the medium by means of time information carried in the radio frame, and the device uses the time information to update a local network allocation vector (NAV). The state of the channel is determined by the physical carrier sense and the virtual carrier sense. In the case where the physical carrier sense is idle and the NAV is equal to 0, the state of the channel is determined to be idle.

Figure 2:
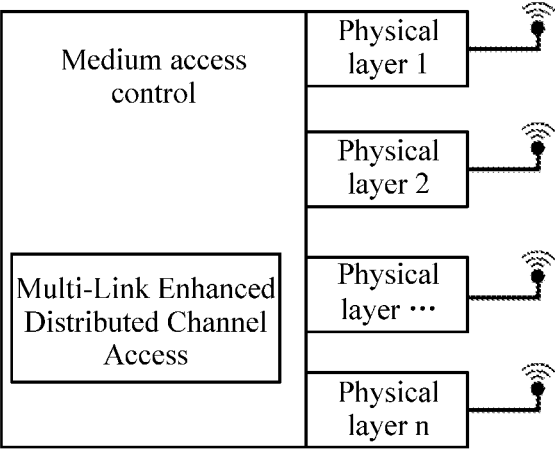
FIG. 2 is a schematic diagram of a logical architecture of a medium access control sublayer and physical layers according to an embodiment.

FIG. 2 is a schematic diagram of a logical architecture of a medium access control sublayer and physical layers according to an embodiment. As shown in FIG. 2, in the case where the device supports multiple communication links, one medium access control (MAC) provides access control functions for multiple PHY logical entities. Each PHY logical entity corresponds to the physical layer function of a communication link. In a MAC logical entity, a Multi-Link Enhanced Distributed Channel Access (ML-EDCA) exists to provide channel access functions for multiple communication links.

The Multi-Link Enhanced Distributed Channel Access function refers to an enhancement to the Enhanced Distributed Channel Access function, which enhances the channel access function for multiple communication links and is consistent with the Enhanced Distributed Channel Access in the Quality of Service (QoS) function.

Figure 3:
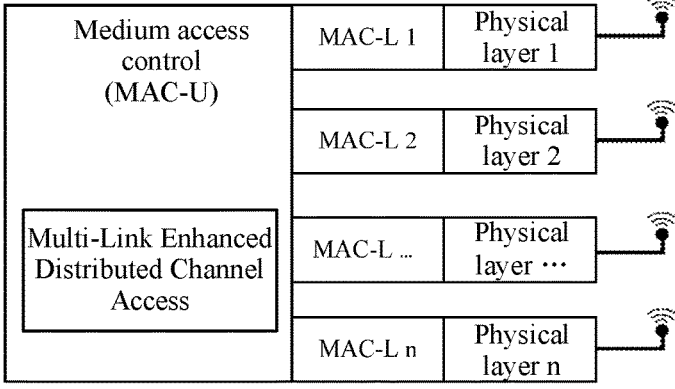
FIG. 3 is a schematic diagram of another logical architecture of a medium access control sublayer and physical layers according to an embodiment.

FIG. 3 is a schematic diagram of another logical architecture of a medium access control sublayer and physical layers according to an embodiment. As shown in FIG. 3, in the case where the device supports multiple communication links, the MAC sublayer is divided into two logical modules: NAC-U and MAC-L. MAC-L is a set of logical functions that each communication link has and correspond to PHYs one to one, while MAC-U is a logical function that is common to all communication links. In MAC-U, an ML-EDCA exists to provide the channel access function for multiple communication links.

In some embodiments, other forms of architecture of the MAC sublayer and PHY sublayers of the device supporting multiple communication links may exist. In other forms of architecture, channel access for multiple communication links is also controlled through an ML-EDCA function.

Figure 4:
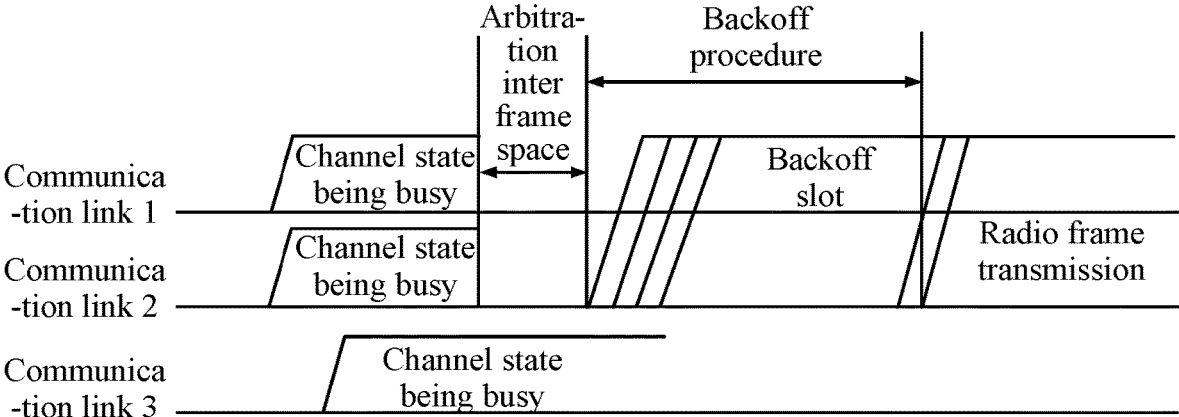
FIG. 4 is a schematic diagram of a communication link determination process according to an embodiment.

FIG. 4 is a schematic diagram of a communication link determination process according to an embodiment. As shown in FIG. 4, the device supports a communication link 1, a communication link 2 and a communication link 3. After a first communication link set (the communication link 1 and the communication link 2) in which a channel state of at least one communication link is idle is detected, an arbitration inter frame space is waited for. A second communication link set (the communication link 1 and the communication link 2) in which a channel state of at least one communication link is idle is detected during the arbitration inter frame space, then a backoff procedure is activated for the communication link 1 and the communication link 2, and the communication link whose channel state is idle in each backoff slot is finally determined as a target communication link set.

In the embodiment, the channel state of each communication link is detected in the backoff procedure before transmission of a radio frame, thus the change of the channel state of each communication link is considered, and then a target communication link is determined. In this way, it is ensured that the channel state of the target communication link is always idle during a preset time period before data transmission and in the backoff procedure, so that the reliability of the multi-link communication is improved.

In an embodiment, the second communication link set being determined according to the channel state of at least one communication link in the first communication link set during the preset time period includes the followings: the channel state of at least one communication link in the first communication link set during the preset time period is determined; and the second communication link set is determined according to a communication link, in the first communication link set, whose channel state is idle during the preset time period.

In the embodiment, the communication link, in the first communication link set, whose channel state is idle during the preset time period is determined as the second communication link set.

In an embodiment, the target communication link set for transmitting the radio frame being determined according to the channel state of at least one communication link in the second communication link set in the backoff procedure includes the followings: the target communication link set is determined according to a communication link, in the second communication link set, whose channel state is idle in each backoff slot in the backoff procedure.

In the embodiment, the communication link, in the second communication link set, whose channel state is idle in each backoff slot in the backoff procedure is determined as the target communication link set for transmission of the radio frame.

In an embodiment, the method further includes the following: in the case where no communication link, in the first communication link set, whose channel state is idle is detected during the preset time period, a first communication link set in which a channel state of at least one communication link is idle is re-determined in the communication link set supported by the device.

In the embodiment, if channel states of communication links in the first communication link set during the preset time period are all busy and no idle communication link exists, a first communication link set in which a channel state of at least one communication link is idle may be re-determined in the communication link set supported by the device.

In an embodiment, the method further includes the following: in the case where no communication link, in the second communication link, whose channel state is idle is detected in any of backoff slots in the backoff procedure, a first communication link set in which a channel state of at least one communication link is idle is re-determined in the communication link set supported by the device.

In the embodiment, if in any backoff slot in the backoff procedure, the channel state of the communication link being idle in the previous backoff slot is detected to be busy in the current backoff slot, that is, no idle communication link exists, a first communication link set in which a channel state of at least one communication link is idle may be re-determined in the communication link set supported by the device.

In an embodiment, each communication link in the communication link set supported by the device includes a primary channel and a secondary channel. A channel state is the channel state of a primary channel of a communication link.

In the embodiment, each communication link in the communication link set supported by the device includes a primary channel and a secondary channel, and detecting the channel state of each communication link refers to detecting the channel state of the primary channel of each communication link. In the embodiment, each communication link corresponds to an NAV, and the NAV is bound to the primary channel of each communication link. That is, the update of the NAV of each communication link is related to the signal of the primary channel and not related to the signal of the other channel.

In an embodiment, the actual size of the bandwidth for each communication link supported by the device to transmit data may or may not be the same.

In an embodiment, the method further includes the following. The transmission bandwidth of each communication link in the target communication link set is determined according to a channel state of a primary channel and a secondary channel of each communication link in the target communication link set during a first set time period before transmission of the radio frame.

In the embodiment, the transmission bandwidth of each communication link in the target communication link set is determined according to the primary channel and the secondary channel, of each communication link, whose channel states are idle during the first set time period before the transmission of the radio frame.

In an embodiment, the method further includes the following: the channel state of at least one communication link in a third communication link set during a second set time period before transmission of the radio frame is detected, where a union of the third communication link set and the target communication link set is the communication link set supported by the device; and a communication link, in the third communication link set, whose channel state is idle during the second set time period is added to the target communication link set.

In the embodiment, communication links in the target communication link set are communication links whose channel states are always idle from 110, while channel states of communication links in the third communication link set are busy in 110. If it is detected that the channel state of a communication link in the third communication link set is converted to idle after 110 and during the second set time period before the transmission of the radio frame, the communication link may also be added to the target communication link set for the transmission of the radio frame, so as to extend the target communication link set, increase the transmission bandwidth and the number of communication links and improve the transmission efficiency.

In an embodiment, the method further includes the following. The transmission bandwidth of each communication link in the target communication link set is determined according to the channel state of each communication link in the target communication link set during a first set time period before transmission of the radio frame. A communication link, in a third communication link set, whose channel state is idle during a second set time period before the transmission of the radio frame is added to the target communication link set, where a union of the third communication link set and the target communication link set is the communication link set supported by the device. The duration of the first set time period is less than or equal to the duration of the second set time period.

In the embodiment, whether to extend the target communication link set is first determined according to the channel state of at least one communication link in the third communication link set during the second set time period before the transmission of the radio frame, and then the transmission bandwidth of each communication link in the target communication link set is determined according to the channel state of each communication link in the target communication link set during the first set time period before the transmission of the radio frame.

In an embodiment, the method further includes the following. The transmission bandwidth of each communication link in the target communication link set is determined according to the channel state of each communication link in the target communication link set during a first set time period before transmission of the radio frame. A communication link, in a third communication link set, whose channel state is idle during a second set time period before the transmission of the radio frame is added to the target communication link set, where a union of the third communication link set and the target communication link set is the communication link set supported by the device. The threshold for determining whether a channel state is idle in the target communication link set during the first set time period is greater than or equal to the threshold for determining whether a channel state is idle in the third communication link set during the second set time period.

In the embodiment, the transmission bandwidth of each communication link in the target communication link set depends on whether the channel state of each communication link is idle during the first set time period before the transmission of the radio frame, the threshold for determining whether the channel state is idle in the target communication link set is denoted as M1. Whether a communication link in the third communication link set can be extended to the target communication link set for the transmission of the radio frame depends on whether the channel state of the communication link is idle during the second set time period before the transmission of the radio frame, the threshold for determining whether the channel state is idle in the third communication link set is denoted as M2. M1 and M2 satisfy that M1≥M2.

In an embodiment, the method further includes the following. For each communication link, the channel state of each communication link is determined to be idle in the case where the channel state is assessed to be idle by a physical layer and a network allocation vector is determined to be 0 according to time information carried in the radio frame.

FIG. 5 is a flowchart of another communication link determination method according to an embodiment. As shown in FIG. 5, the method provided in the embodiment includes 210 to 270.

In 210, a first communication link set in which a channel state of at least one communication link is idle is determined in a communication link set supported by a device.

In 220, the channel state of the first communication link set during a preset time period is detected.

In 230, a second communication link set is determined according to a communication link, in the first communication link set, whose channel state is idle during the preset time period.

In the embodiment, if it is determined that an idle communication link exists during the preset time period, 240 is continuously executed and a random backoff procedure is completed.

In an embodiment, in the case where no communication link whose channel state is idle is detected during the preset time period, 210 is re-executed to re-determine a first communication link set in which a channel state of at least one communication link is idle in the communication link set supported by the device.

In 240, a target communication link set is determined according to a communication link, in the second communication link set, whose channel state is idle in each backoff slot in the backoff procedure.

In the embodiment, in each backoff slot in the backoff procedure, if it is determined that a communication link exists whose channel state is idle from the start of the backoff procedure to the current backoff slot, a backoff slot counter is decremented, and 240 is repeated until the backoff slot counter becomes 0. The communication link whose channel state is idle detected in the last backoff slot composes the target communication link set, which can be used for sending the radio frame to transmit data. The target communication link set is a subset of the communication link set supported by the device.

In the first backoff slot in the backoff procedure, the channel state of each communication link in the second communication link set is determined; in each backoff slot other than the first backoff slot, the channel state of the communication link whose channel state is idle in the previous backoff slot in the current backoff slot is determined until the communication link who is idle in each backoff slot is detected, and thus the target communication link set is obtained. If an idle communication link exists in each backoff slot, the backoff slot counter is decremented. If no idle communication link exists, a first communication link set in which a channel state of at least one communication link is idle is re-determined in the communication links supported by the device.

In an embodiment, in the case where no communication link whose channel state is idle is detected in any of each backoff slot in the backoff procedure, 210 is re-executed to re-determine a first communication link set in which a channel state of at least one communication link is idle in the communication link set supported by the device.

In the preceding embodiment, the premise of the device starting the backoff procedure is that the backoff procedure of the device is not activated.

In 250, the channel state of at least one communication link in a third communication link set during a second set time period before transmission of the radio frame is detected, where a union of the third communication link set and the target communication link set is the communication link set supported by the device.

In 260, a communication link, in the third communication link set, whose channel state is idle during the second set time period is added to the target communication link set.

In an embodiment, the channel state of at least one communication link in the third communication link set during the second set time period before the backoff slot counter is decremented to 0 is allowed to be detected. The third communication link is a communication link other than the target communication link set among the communication links supported by the device. The channel state of the third communication link is non-idle (busy) in 210 but may be converted to the idle state after the first communication link set is determined, and therefore, the target communication link set can be extended through 260 and 270 so that the device can transmit data over a larger bandwidth and more communication links.

In 270, the transmission bandwidth of each communication link in the target communication link set is determined according to channel states of a primary channel and a secondary channel of each communication link in the target communication link set during a first set time period before transmission of the radio frame.

In an embodiment, 260 is executed before 270, or 270 and 260 are executed simultaneously, that is, the second set time period is greater than or equal to the first set time period.

In an embodiment, the threshold for determining whether a channel state is idle in 270 is greater than or equal to the threshold for determining whether a channel state is idle in 260.

FIG. 6 is a flowchart of another communication link determination method according to an embodiment. As shown in FIG. 6, the method provided in the embodiment includes 21 to 27.

In 21, a first communication link set in which a channel state of at least one communication link is idle is determined in a communication link set supported by a device.

In 22, whether a communication link whose channel state is idle during a preset time period exists in the first communication link set is detected. In response to the detection result that the communication link whose channel state is idle during the preset time period exists in the first communication link set, 23 is executed. In response to the detection result that no communication link whose channel state is idle during the preset time period exists in the first communication link set, 21 is re-executed.

In 23, a second communication link set is determined.

In 23, the communication link, in the first communication link set, whose channel state is idle during the preset time period is determined as the second communication link set.

In 24, it is detected whether a communication link whose channel state is idle in the current backoff slot and previous backoff slots in a backoff procedure exists in the second communication link set. In response to the detection result that the communication link whose channel state is idle in the current backoff slot and previous backoff slots in the backoff procedure exists in the second communication link set, 25 is executed. In response to the detection result that no communication link whose channel state is idle in the current backoff slot and previous backoff slots in the backoff procedure exists in the second communication link set, 21 is re-executed.

In 25, a backoff slot counter is decremented by 1.

In 26, whether the backoff slot counter is 0 is detected. In response to the detection result that the backoff slot counter is 0, 27 is executed. In response to the detection result that the backoff slot counter is not 0, 24 is continuously executed, and the detection is continued of the communication link whose channel state is idle in the current backoff slot and previous backoff slots.

In 27, a target communication link set for transmitting a radio frame is determined.

In 27, a communication link, in the second communication link set, whose channel state is idle in each backoff slot in the backoff procedure is determined as the target communication link set.

The device supporting three communication links is taken as an example. The three communication links are a communication link 1, a communication link 2 and a communication link 3 respectively corresponding to NAV1, NAV2 and NAV3. Before the first contention for the channel by the three communication links, the backoff slot counter is initialized. For example, the initial value of the backoff slot counter is 5. In the case of the first contention for the channel, a clear channel assessment is performed on the three communication links. For example, if the NAV corresponding to the communication link 1 and the NAV corresponding to the communication link 2 are both 0, and the result of the physical carrier sense corresponding to a primary channel is also idle, it is determined that the communication link 1 and the communication link 2 compose the first communication link set and share the same backoff procedure, and the backoff procedure is activated for the communication link 1 and the communication link 2.

The channel state of each communication link in the first communication link set is determined during the preset time period. If the channel states are all busy, the backoff procedure is suspended, and a first communication link set is re-determined and the backoff procedure is re-activated. If a communication link whose channel state is idle exists, the backoff slot decrementing process in the backoff procedure is continued. For example, if it is determined that the channel states of the communication link 1 and the communication link 2 are idle during the preset time period, the channel states of the communication link 1 and the communication link 2 are continuously detected in the backoff slot decrementing process.

The communication link whose channel state is idle in each backoff slot in the backoff slot decrementing process may finally serve as the target communication link set. In each backoff time slot, if a communication link whose channel state is idle exists, the backoff slot counter is decremented by 1, the idle communication link is continuously detected in the next backoff slot and the operation is repeated until the backoff slot counter becomes 0, and the communication link detected in the last backoff slot is the communication link which is always idle in the backoff procedure. In this way, the target communication link set is obtained. For example, if the channel state of the communication link 2 in the last backoff slot is busy, the communication link 1 is the target communication link set for transmitting data. If it is detected that channel states of all communication links are busy in any backoff slot, the current backoff slot counter is saved and the backoff procedure is suspended.

In the preceding example, the bandwidth available for the communication link 1 to transmit the radio frame is determined by the method described below. The bandwidth of the primary channel of the communication link 1 and the bandwidth of the secondary channel whose channel state is idle during a first set period of time T1 before the communication link 1 transmits data are the bandwidth available for the transmission of the radio frame.

In the preceding example, in addition to the communication link 1, the target communication link set may also be extended. The channel state of a third communication link (that is, the communication link 2 and the communication link 3 other than the target communication link set in the preceding example) during a second set time period T2 before data is transmitted is detected, and the communication link whose channel state is idle during T2 is added to the target communication link set. For example, if the channel state of communication link 3 is idle during T2, the target communication link set may further include the communication link 3 in addition to the communication link 1, and the device may transmit data through the communication link 1 and the communication link 3.

In an embodiment, T1≤T2, so as to achieve that the determined transmission bandwidth is the transmission bandwidth of each communication link (including the extended communication link) in the target communication link set. For example, T1 is 25 us before data transmission, and T2 is 34 us or 43 us before data transmission.

In an embodiment, the threshold for determining that the channel is busy or idle during T1 should be greater than or equal to the threshold for determining that the channel is busy or idle during T2. For example, during T1, the threshold for determining that the channel is busy or idle is −62 dbm or −72 dbm, while during T2, the threshold for determining that the channel is busy or idle is −82 dbm, so as to sufficiently ensure that the extended communication link is in the idle state to satisfy the requirements for data transmission.

FIG. 7 is a schematic diagram of another communication link determination process according to an embodiment. As shown in FIG. 7, the device supports a communication link 1, a communication link 2 and a communication link 3. After it is detected that the channel state of the communication link 1 and the channel state of the communication link 2 are idle, an arbitration inter frame space is waited for. It is detected that the channel state of the communication link 1 and the channel state of the communication link 2 are idle during the arbitration inter frame space, then a backoff procedure is activated for the communication link 1 and the communication link 2, and the communication link whose channel state is idle in each backoff slot is finally determined as a target communication link set. In addition, during a first set time period before transmission of a radio frame, the transmission bandwidth may be determined according to a primary channel and a secondary channel whose channel state is idle; during a second set time period of before the transmission of the radio frame, whether to extend the target communication link may be determined by detecting the channel state of the communication link 3.

According to the communication link determination method of the embodiment, the channel state is determined based on the primary channel, the transmission bandwidth is determined jointly based on the primary channel and the secondary channel, and the communication link whose channel state is always idle is used for transmitting data, so that the reliability of multiple communication links transmitting data is sufficiently ensured. In addition, the channel state of at least one communication link in a third communication link set is detected to extend the target communication link set, so that communication linkd for data transmission and the transmission bandwidth are increased, and the communication efficiency is improved. The relationship between the first set time period and the second set time period is configured, so that the communication link finally used for transmitting the radio frame is ensured to be in the idle state, the transmission bandwidth of each communication link available for transmission of the radio frame is determined, and thus the reliability is further improved.

The embodiment of the present application further provides a communication link determination apparatus. FIG. 8 is a structural diagram of a communication link determination apparatus according to an embodiment. As shown in FIG. 8, the communication link determination apparatus includes a first link determination module 310, a second link determination module 320 and a target link determination module 330.

The first link determination module 310 is configured to determine a first communication link set in which a channel state of at least one communication link is idle in a communication link set supported by a device. The second link determination module 320 is configured to determine a second communication link set according to the channel state of at least one communication link in the first communication link set during a preset time period. The target link determination module 330 is configured to determine a target communication link set for transmitting a radio frame according to a channel state of at least one communication link in the second communication link set in a backoff procedure.

According to the communication link determination apparatus of the embodiment, the channel state of each communinication link is detected in the backoff procedure before transmission of the radio frame, thus the change of the channel state of each communication link is considered, and then a target communication link is determined. In this way, it is ensured that the channel state of the target communication link is always idle during the preset time period before data transmission and in the backoff procedure, so that the reliability of the multi-link communication is improved.

In an embodiment, the second link determination module 320 includes a first detection unit and a link determination unit. The first detection unit is configured to detect the channel state of the first communication link set during the preset time period. The link determination unit is configured to determine the second communication link set according to a communication link, in the first communication link set, whose channel state is idle during the preset time period.

In an embodiment, the target link determination module 330 is configured to determine the target communication link set according to a communication link, in the second communication link set, whose channel state is idle in each backoff slot in the backoff procedure.

In an embodiment, a first re-determination module is further included. The first re-determination module is configured to in the case where no communication link whose channel state is idle is detected during the preset time period, a first communication link set whose channel state is idle is re-determined in the communication link set supported by the device.

In an embodiment, a second re-determination module is further included. The second re-determination module is configured to in the case where no communication link whose channel state is idle is detected in any of each backoff slot in the backoff procedure, a first communication link set in which a channel state of at least one communication link is idle is re-determined in the communication link set supported by the device.

In an embodiment, each communication link in the communication link set supported by the device includes a primary channel and a secondary channel. A channel state is the channel state of a primary channel corresponding to a communication link.

In an embodiment, a bandwidth determination module is further included. The bandwidth determination module is configured to determine the transmission bandwidth of each communication link in the target communication link set according to channel states of a primary channel and a secondary channel of each communication link in the target communication link set during a first set time period before transmission of the radio frame.

In an embodiment, a non-target link detection module and an extension module are further included. The non-target link detection module is configured to detect the channel state of at least one communication link in a third communication link set during a second set time period before transmission of the radio frame, where a union of the third communication link set and the target communication link set is the communication link set supported by the device. The extension module is configured to add a communication link, in the third communication link set, whose channel state is idle during the second set time period to the target communication link set.

In an embodiment, the duration of the first set time period is less than or equal to the duration of the second set time period.

In an embodiment, the threshold for determining whether a channel state is idle in the target communication link set during the first set time period is greater than or equal to the threshold for determining whether a channel state is idle in the third communication link set during the second set time period.

In an embodiment, for each communication link, the channel state of each communication link is determined to be idle in the case where the channel state is assessed to be idle by a physical layer and a network allocation vector is determined to be 0 according to time information carried in the radio frame.

In an embodiment, the communication link set supported by the device is a communication link set supported by both a data receiver and a data sender.

The communication link determination apparatus provided in the embodiment and the communication link determination method provided in the preceding embodiments belong to the same inventive concept. For technical details not described in detail in the embodiment, reference may be made to any one of the preceding embodiments, and the embodiment has the same effects as executing the communication link determination method.

The embodiment of the present application further provides a device. The communication link determination method may be executed by a communication link determination apparatus which may be implemented by means of software and/or hardware and integrated in the device. The device supports transmitting data with another device through at least one communication link.

FIG. 9 is a structural diagram of a device according to an embodiment. As shown in FIG. 9, the device provided in the embodiment includes a processor 410 and a storage apparatus 420. The device may include one or more processors. One processor 410 is shown as an example in FIG. 9. The processor 410 and the storage apparatus 420 in the device may be connected via a bus or in other manners. The connection via a bus is shown as an example in FIG. 9.

One or more programs are executed by one or more processors 410 to cause the one or more processors to implement the communication link determination method of any one of the preceding embodiments.

The storage apparatus 420 in the device, as a computer-readable storage medium, may be configured to store one or more programs which may be software programs, computer-executable programs and modules, such as program instructions/modules (for example, modules in the communication link determination apparatus, which include the first link determination module 310, the second link determination module 320 and the target link determination module 330, as shown in FIG. 8) corresponding to the communication link determination method of the embodiments of the present disclosure. The processor 410 runs the software programs, instructions and modules stored in the storage apparatus 420 to execute function applications and data processing of the device, that is, to implement the communication link determination method of the preceding method embodiments.

The storage apparatus 420 mainly includes a program storage region and a data storage region. The program storage region may store an operating system and an application program required by at least one function. The data storage region may store data (such as the first communication link set and the second communication link set in the preceding embodiments) created based on use of the device. Additionally, the storage apparatus 420 may include a high-speed random-access memory and may further include a nonvolatile memory, such as at least one magnetic disk memory, a flash memory or another nonvolatile solid-state memory. In some examples, the storage apparatus 420 may further include memories which are remotely disposed respect to the processor 410, and these remote memories may be connected to the device via a network. Examples of the preceding network include, but are not limited to, the Internet, an intranet, a local area network, a mobile communication network and a combination thereof.

Moreover, when the one or more programs included in the preceding device are executed by one or more processors 410, operations described below are implemented. A first communication link set in which a channel state of at least one communication link is idle is determined in a communication link set supported by a device. A second communication link set is determined according to the channel state of at least one communication link in the first communication link set during a preset time period. A target communication link set for transmitting a radio frame is determined according to a channel state of at least one communication link in the second communication link set in a backoff procedure.

The device provided in the embodiment and the communication link determination method provided in the preceding embodiments belong to the same inventive concept. For technical details not described in detail in the embodiment, reference may be made to any one of the preceding embodiments, and the embodiment has the same effects as executing the communication link determination method.

The embodiments of the present application further provides a storage medium including computer-executable instructions, and the computer-executable instructions are used for executing a communication link determination method when executed by a computer processor.

From the preceding description of the embodiments, the present application may be implemented by means of both software and general-purpose hardware, and also by means of hardware. The technical solutions of the present application may be embodied in the form of a software product. The software product in a computer may be stored in a computer-readable storage medium such as a floppy disk, read-only memory (ROM), random-access memory (RAM), flash memory, hard disk or optical disc in the computer and includes multiple instructions for enabling a computer device (which may be a personal computer, a server or a network device) to execute the method of any embodiment of the present application.

The preceding are only example embodiments of the present application and are not intended to limit the scope of the present application.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for the local technical environment and may be implemented using any suitable data storage technology, for example, but not limited to, a read-only memory (ROM), a random-access memory (RAM), and an optical memory apparatus and system (a digital video disc (DVD) or a compact disc (CD)). Computer-readable media may include non-transitory storage media. The data processor may be of any type suitable for the local technical environment, such as, but is not limited to, a general-purpose computer, a special-purpose computer, a microprocessor, a digital signal processor (DSP), an application specific integrated circuit (ASIC), a field-programmable gate array (FPGA) and a processor based on a multi-core processor architecture.

What is claimed is:

1. A wireless communication method, performed by a device, comprising:

determining, by the device, a channel state of a communication link to be idle in response to a physical carrier sense (CS) function of a physical layer corresponding to the communication link being idle and a network allocation vector (NAV) being equal to 0, wherein the communication link is one of communication links in a communication link set supported by the device;

determining, by the device, a transmission bandwidth of the communication link according to (i) a channel state of a primary channel of the communication link and (ii) a channel state of a secondary channel of the communication link during a set time period before a transmission of a radio frame by the device; and transmitting, by the device, the radio frame based on the transmission bandwidth of the communication link, wherein the device comprises a medium access control (MAC) sublayer and at least one physical layer, the MAC sublayer is divided into one upper MAC (MAC-U) sublayer and at least one lower MAC (MAC-L) entity, the MAC-U sublayer is configured to perform functionalities that are common across all the communication links, and each MAC-L entity is configured to perform functionalities that are local to a respective communication link that corresponds to the MAC-L entity and a respective physical layer.

2. The method according to claim 1, wherein the NAV is determined according to time information carried in the radio frame.

3. The method according to claim 1, wherein a channel state of each communication link is a channel state of the primary channel of each communication link.

4. The method according to claim 1, wherein the set time period is 25 us, a threshold for determining the channel state of the secondary channel is −62 dbm, and a threshold for determining the channel state of the primary channel is −82 dbm.

5. The method according to claim 1, wherein the physical CS function is performed by the respective physical layer according to a received signal at the respective physical layer.

6. The method according to claim 1, wherein the device is a sending device supporting transmission of the radio frame with a receiving device through the communication link, and the radio frame is a data frame, a management frame, or a control frame.

7. The method according to claim 1, wherein the set time period is 25 us.

8. A device, comprising a medium access control (MAC) sublayer and at least one physical layer, a processor and a memory for storing execution instructions, wherein the MAC sublayer is divided into one upper MAC (MAC-U) sublayer and at least one lower MAC (MAC-L) entity, the MAC-U sublayer is configured to perform functionalities that are common across all communication links, and each MAC-L entity is configured to perform functionalities that are local to a respective communication link that corresponds to the MAC-L entity and a respective physical layer, wherein the execution instructions are executed by the processor cause the processor to:

for each communication link of the communication links in a communication link set supported by the device, in response to a physical carrier sense (CS) function of the respective physical layer being idle and a network allocation vector (NAV) being equal to 0, determine a channel state of the communication link to be idle; and determine a transmission bandwidth of the communication link according to (i) a channel state of a primary channel of the communication link; and (ii) a channel state of a secondary channel of the communication link during a set time period before a transmission of a radio frame by the device;

transmit the radio frame based on the transmission bandwidth of the communication link.

9. The device according to claim 8, wherein the NAV is determined according to time information carried in the radio frame.

10. The device according to claim 8, wherein a channel state of each communication link is a channel state of the primary channel of each communication link.

11. The device according to claim 8, wherein the set time period is 25 us, a threshold for determining the channel state of the secondary channel is −62 dbm, and a threshold for determining the channel state of the primary channel is −82 dbm.

12. The device according to claim 8, wherein the physical CS function is performed by the respective physical layer according to a received signal at the respective physical layer.

13. The device according to claim 8, wherein the device is a sending device supporting transmission of the radio frame with a receiving device through the communication link, and the radio frame is a data frame, a management frame, or a control frame.

14. The device according to claim 8, wherein the set time period is 25 us.

15. A non-transitory computer-readable storage medium, which is configured to store a computer program, wherein the computer program is executed by a processor in a device, wherein the device comprises a medium access control (MAC) sublayer and at least one physical layer, the MAC sublayer is divided into one upper MAC (MAC-U) sublayer and at least one lower MAC (MAC-L) entity, the MAC-U sublayer is configured to perform functionalities that are common across all communication links, and each MAC-L entity is configured to perform functionalities that are local to a respective communication link that corresponds to the MAC-L entity and a respective physical layer;

wherein the computer program when executed by the processor of the device implements:

for each communication link of communication links in a communication link set supported by the device, in response to a physical CS function of the respective physical layer being idle and a network allocation vector (NAV) being equal to 0, determining a channel state of the communication link to be idle; and determining a transmission bandwidth of the communication link according to (i) a channel state of a primary channel of the communication link; and (ii) a channel state of a secondary channel of the communication link during a set time period before a transmission of a radio frame by the device;

transmitting the radio frame based on the transmission bandwidth of the communication link.

16. The non-transitory computer-readable storage medium according to claim 15, wherein the NAV is determined according to time information carried in the radio frame.

17. The non-transitory computer-readable storage medium according to claim 15, wherein a channel state of each communication link is a channel state of the primary channel of each communication link.

18. The non-transitory computer-readable storage medium according to claim 15, wherein the set time period is 25 us, a threshold for determining the channel state of the secondary channel is −62 dbm, and a threshold for determining the channel state of the primary channel is −82 dbm.

19. The non-transitory computer-readable storage medium according to claim 15, wherein the physical CS function is performed by the respective physical layer according to a received signal at the respective physical layer.

20. The non-transitory computer-readable storage medium according to claim 15, wherein the set time period is 25 us.

* * * * *